United States Patent [19]

Allen et al.

[11] Patent Number: 4,517,626
[45] Date of Patent: May 14, 1985

[54] SOLID ELECTROLYTE CAPACITOR ANODE ASSEMBLY

[75] Inventors: Michael D. Allen, Alfred; John E. Van Voorhis, Waterboro, both of Me.

[73] Assignee: Sprague Electric Company, North Adams, Mass.

[21] Appl. No.: 422,808

[22] Filed: Sep. 24, 1982

[51] Int. Cl.³ .............................................. H01G 9/00
[52] U.S. Cl. ...................................... 361/433; 29/570
[58] Field of Search ........................... 361/433; 29/570

[56] References Cited

U.S. PATENT DOCUMENTS

| | | | |
|---|---|---|---|
| 1,956,365 | 4/1934 | van Geel et al. | 175/315 |
| 2,871,426 | 1/1959 | Hilton et al. | 317/230 |
| 3,798,751 | 3/1974 | Goshgarian | 29/570 |
| 3,818,286 | 6/1974 | Ganz | 361/433 |
| 4,138,712 | 2/1979 | Leszlauer | 361/433 |

Primary Examiner—L. T. Hix
Assistant Examiner—Douglas S. Lee

[57] ABSTRACT

A low capacitance solid electrolyte capacitor employs an anode assembly of a body portion which is a short piece of valve-metal wire to which is attached, preferably by welding, a riser portion which is of narrower cross-section wire than the body portion. The anode assembly is cleaned and processed into a capacitor in the same manner as prior art porous pellet capacitor sections.

5 Claims, 3 Drawing Figures

U.S. Patent May 14, 1985 4,517,626
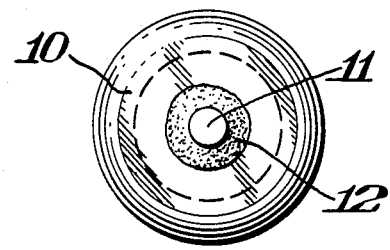
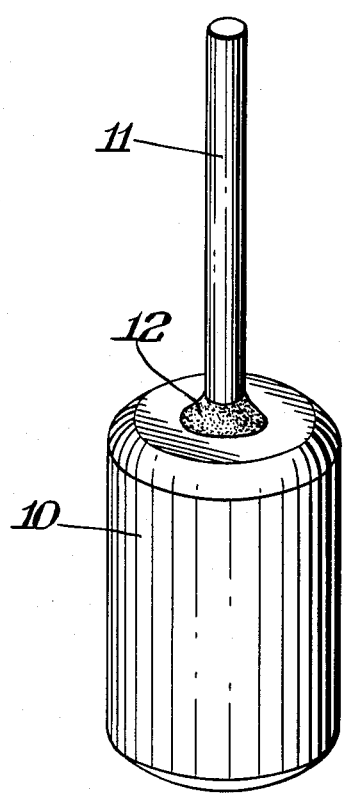
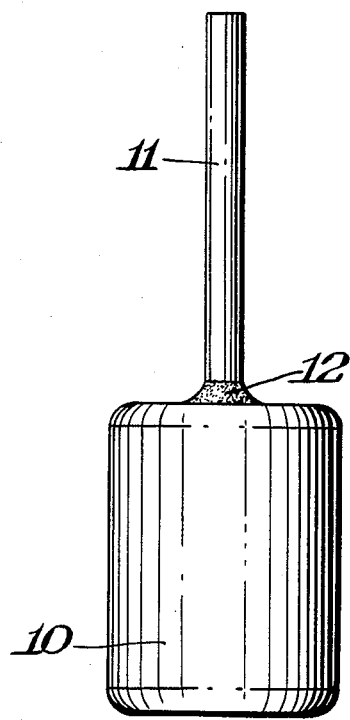

SOLID ELECTROLYTE CAPACITOR ANODE ASSEMBLY

BACKGROUND OF THE INVENTION

This invention relates to a low capacitance solid electrolyte capacitor, and more particularly to a solid electrolyte capacitor with improved electrical properties and reliability at low capacitance rating through the use of an anode assembly of a stub of solid wire for a body portion and a riser portion of a smaller cross-section wire attached thereto. The capacitor provides a lower capacitance rating than is possible with even small porous pellets which are also much more difficult to handle in any manufacturing scheme because of their small size.

Solid electrolytic capacitors having a sintered porous pellet body are well-known in the prior art, as are those in which powder is adhered to a substrate, which may be a wire, so as to form a pellet. Wet electrolytic capacitors which have wire anodes are well-known also. In some of these prior art devices, wire in the form of a helix or coil has been used. In all events, in a wet electrolytic capacitor, the anode is immersed in a liquid electrolyte; and in a solid electrolyte capacitor, the solid electrolyte is deposited on the anode and adheres to it.

The coil or helical configuration of the prior art is not suitable for the present invention as it provides a higher than desired capacitance and CV product because of its high surface area. A completely straight wire anode is also unsatisfactory, in that solid electrolyte tends to be shed from the sides or else wicks to give a non-uniform electrolyte layer.

Porous pellet solid electrolytic capacitors do not suffer from the above adhesion problems, inasmuch as the electrolyte is held on the many surfaces of the pellet. However, even the smallest handleable porous pellets have a relatively high surface area, and hence provide a relatively high capacitance. There is a need in industry today for a solid electrolyte capacitor with lower capacitance than heretofore available at lower cost than a porous pellet would provide.

SUMMARY OF THE INVENTION

The present invention overcomes the above shortcomings and difficulties of prior art anodes by providing a solid electrolyte capacitor in which the conventional porous pellet is replaced by an anode assembly of a stub of solid wire and a smaller wire riser. The anode assembly provides a capacitor with good electrical properties and reliability and lower capacitance and CV product than possible with porous pellets, while being simpler to handle in manufacture and hence more economical than very small porous anodes or small wire coils. The riser of this invention is of smaller diameter wire than the wire stub and is attached to the body preferably by welding, which may be done in volume automatically. The anode assemblies are cleaned of handling oils and contamination in the weld area by heating in a furnace at about 2100° C. The anode assemblies are then anodized and processed into solid electrolyte capacitors in the same way porous pellet units would be.

The differences in wire size between the anode body portion and the attached riser portion provide a shoulder similar to that of a pellet. The shoulder provides a gauge for dipping the units in the conventional solid electrolyte precursor solution, and thereby offers control over the height of the electrolyte coverage. It also aids in holding the electrolyte precursor to the anode assembly during conversion to a solid electrolyte, because the corners and edges of the assembly provide additional surface tension.

While an object of the invention is to provide a small capacitor of lower capacitance than is possible with a porous pellet or coiled wire, if a slightly higher capacitance is required, the wire forming the body portion of the anode assembly may be etched, roughened, embossed, grooved, or the like to increase its surface area.

BRIEF DESCRIPTION OF THE DRAWING

FIG. 1 is a perspective view of the anode assembly of the present invention.

FIG. 2 is a side view of the anode assembly of FIG. 1.

FIG. 3 is a top plan view of the anode assembly of FIG. 1.

DESCRIPTION OF THE PREFERRED EMBODIMENTS

A short length of valve-metal wire, preferably tantalum, forms the body portion 10 of the capacitor anode assembly. A second wire which serves as riser 11 is of narrower cross section and is welded at 12 to the center of an end surface of the body portion 10. Wire 11 is preferably tantalum also.

As shown in FIGS. 1 and 2, the short wire segment or stub which forms the anode body portion 10 of anode assembly 10, 11 resembles a conventional pellet. However, since body portion 10 is a solid wire, it is not porous the way a conventional pellet would be. Attachment of the much narrower riser 11 is shown in all the Figures, with FIGS. 1 and 2 clearly showing the similarity in shape to a conventional porous pellet capacitor section and FIG. 3 showing a top view of the difference in relative diameters of the two wires making up the anode assemblies of this invention.

The shape of body portion 10 of the anode assemblies of this invention is important as it provides horizontal surfaces to which the solid electrolyte precursor solution, usually manganous nitrate, can cling particularly during pyrolysis during which the precursor is converted to the solid electrolyte, manganese dioxide. A straight wire anode or an anode in which the riser lead is of the same or substantially the same diameter does not provide such an upper surface to hold the electrolyte. Also, the pellet shape of body portion 10 provides a simple gauge while dipping the units into the manganous nitrate solution so that the units are dipped to the same depth which is not so with the straight wire anode.

In the following examples, the anode body portion 10 is 0.080 inch (2.03 mm) high regardless of diameter. Standard tantalum riser wires of 0.012 inch (0.3 mm) or 0.014 inch (0.36 mm) were welded to one end of body portion 10. The anode assemblies 10 and 11 were heated to clean them and give a pure tantalum surface by passing them through a furnace maintained at 2100° C. The anode assemblies were anodized to 100V in a standard formation electrolyte, e.g. dilute phosphoric acid as taught by Bernard and Szpak in U.S. Pat. No. 4,131,520 issued Dec. 26, 1978. The wet capacitance ($\mu$F), percentage dissipation factor, and leakage current ($\mu$A) at 70V were measured.

EXAMPLE 1

Ten lots using 0.035 inch (0.89 mm) diameter wire for the anode body portion were tested for the above parameters:

TABLE 1

| Lot | Capacitance, $\mu$F | % DF | Leakage current, $\mu$A |
| --- | --- | --- | --- |
| 1 | 0.009 | 1.1 | 0.09 |
| 2 | 0.009 | 1.1 | 0.00 |
| 3 | 0.009 | 1.1 | 0.00 |
| 4 | 0.009 | 1.1 | 0.02 |
| 5 | 0.013 | 1.1 | 0.09 |
| 6 | 0.007 | 1.1 | 0.00 |
| 7 | 0.009 | 1.1 | 0.01 |
| 8 | 0.009 | 1.1 | 0.12 |
| 9 | 0.009 | 1.1 | 0.01 |
| 10 | 0.009 | 1.1 | 0.01 |
| Average: | 0.009 | 1.1 | 0.01 |

CV = 0.009 $\mu$F × 100 V = 0.9 $\mu$F − V

EXAMPLE 2

The surface area of the 0.080 inch (2.03 mm) long body portion for different diameter wires was calculated, and, the CV product was predicted. For ease of comparison, the actual results from Example 1 are given.

TABLE 2

| Diameter, inch | Surface Area, in$^2$ | CV Product, predicted |
| --- | --- | --- |
| 0.035 | 0.01072 | 0.90 (known) |
| 0.040 | 0.01257 | 1.06 |
| 0.045 | 0.01449 | 1.22 |
| 0.050 | 0.01649 | 1.38 |
| 0.055 | 0.01858 | 1.56 |

EXAMPLE 3

Another lot of units was made using 0.050 inch (1.27 mm) diameter wire and sintered and anodized as above. Again, capacitance, dissipation factor, and leakage current were measured.

TABLE 3

| Lot | Capacitance, $\mu$F | % DF | Leakage current, $\mu$A |
| --- | --- | --- | --- |
| 1 | 0.014 | 1.8 | 0.03 |
| 2 | 0.013 | 1.8 | 0.03 |
| 3 | 0.014 | 1.7 | 0.02 |
| 4 | 0.013 | 1.8 | 0.01 |
| 5 | 0.014 | 1.6 | 0.01 |
| 6 | 0.013 | 1.6 | 0.01 |
| 7 | 0.014 | 1.8 | 0.02 |
| 8 | 0.014 | 1.6 | 0.01 |
| 9 | 0.014 | 1.4 | 0.05 |
| 10 | 0.013 | 2.0 | 0.02 |
| 11 | 0.015 | 2.3 | 0.01 |
| 12 | 0.014 | 1.6 | 0.02 |
| 13 | 0.014 | 1.5 | 0.02 |
| 14 | 0.013 | 1.6 | 0.02 |
| 15 | 0.014 | 1.7 | 0.01 |
| 16 | 0.013 | 1.8 | 0.01 |
| Average: | 0.014 | 1.7 | 0.02 |

CV = 0.014 $\mu$F × 100 V = 1.4 $\mu$F − V

For the 0.050 inch diameter wire, predicted CV product from Table 2 was 1.38 $\mu$F-V; the measured result above was 1.4 $\mu$F-V, very good agreement. By comparison, a typical porous pellet of the same size has a CV product of 50 $\mu$F-V. In order to obtain the same capacitance rating, this porous pellet would have to be anodized to a voltage approximately 50 times that needed for the wire pellet, reducing capacitance by increasing the dielectric layer thickness. This is practically impossible to accomplish under normal circumstances.

Thus, the present invention permits the economical manufacture of low-capacitance, low CV product, solid electrolyte capacitors.

What is claimed:

1. A low capacitance solid electrolyte capacitor anode assembly comprising an anode of a stub of valve-metal wire as a non-porous solid body portion and a substantially smaller diameter valve-metal wire as a riser portion directly attached to the center of an end surface of said body portion.

2. A solid electrolyte capacitor anode assembly according to claim 1 wherein said valve metal is tantalum.

3. A solid electrolyte capacitor anode assembly according to claim 2 wherein said anode assembly is cleaned at about 2100° C. to provide a clean surface for subsequent capacitor processing.

4. A solid electrolyte capacitor anode assembly according to claim 1 wherein said riser portion is welded to said body portion.

5. A solid electrolyte capacitor anode assembly according to claim 1 wherein the surface of said body portion is etched or roughened.

* * * * *